US010010827B2

(12) United States Patent
Buckholtz

(10) Patent No.: US 10,010,827 B2
(45) Date of Patent: Jul. 3, 2018

(54) PROCESS FOR TREATMENT OF SEWAGE SLUDGE

(71) Applicant: Harry Buckholtz, Lewiston, NY (US)

(72) Inventor: Harry Buckholtz, Lewiston, NY (US)

(*) Notice: Subject to any disclaimer, the term of this patent is extended or adjusted under 35 U.S.C. 154(b) by 355 days.

(21) Appl. No.: 14/808,481

(22) Filed: Jul. 24, 2015

(65) Prior Publication Data
US 2017/0022081 A1  Jan. 26, 2017

(51) Int. Cl.
C02F 1/50 (2006.01)
B01D 53/12 (2006.01)
C02F 11/00 (2006.01)
B01D 53/48 (2006.01)
B01D 53/78 (2006.01)

(52) U.S. Cl.
CPC ......... B01D 53/12 (2013.01); B01D 53/485 (2013.01); C02F 11/004 (2013.01); B01D 53/78 (2013.01); B01D 2252/10 (2013.01); B01D 2253/102 (2013.01); B01D 2257/306 (2013.01); B01D 2257/504 (2013.01); B01D 2257/90 (2013.01); B01D 2257/93 (2013.01); B01D 2258/02 (2013.01); C02F 2209/008 (2013.01); C02F 2303/04 (2013.01)

(58) Field of Classification Search
CPC ...... C02F 1/50; C02F 2303/04; C02F 11/004; C02F 11/14; C02F 1/66; C02F 2209/008; B01D 2252/10; B01D 2253/102; B01D 2257/306; B01D 2257/504; B01D 2257/90; B01D 2257/93; B01D 2258/02; B01D 53/12; B01D 53/485; B01D 53/78

USPC ........................................................ 210/764
See application file for complete search history.

(56) References Cited

U.S. PATENT DOCUMENTS

| 5,575,928 A | 11/1996 | Peltier, Jr. | |
|---|---|---|---|
| 6,267,931 B1* | 7/2001 | Nickens | B01D 47/06 137/597 |
| 6,821,481 B1 | 11/2004 | Osajima | |
| 2005/0079124 A1* | 4/2005 | Sanderson | A61L 9/145 423/477 |
| 2007/0084804 A1* | 4/2007 | Buckholtz | C02F 11/004 210/764 |
| 2011/0247985 A1* | 10/2011 | Theodore | C02F 1/66 210/720 |
| 2014/0290318 A1* | 10/2014 | Buckholtz | C05G 3/00 71/11 |

* cited by examiner

Primary Examiner — Claire A Norris
(74) Attorney, Agent, or Firm — Vincent G. LoTempio; Kloss, Stenger & LoTempio; David T. Stephenson

(57) ABSTRACT

A method for pathogen destruction in dilute sewage sludge or other dilute streams containing pathogens, including Helminth ova, while minimizing vapor generation and atmospheric emissions. In addition to conventional waste treatment steps, including grit removal, clarification, and concentration of waste material, vaporized waste treatment compounds are recycled to treat divert untreated waste in a scrubber. In the scrubber, waste material is treated while also acting as a reactive agent to scrub potentially hazardous or noxious gas, particularly gaseous MITC, from the treatment system. Recycling of vaporized treatment compounds provides a reduction of potentially toxic emissions and increased efficiency during treatment.

19 Claims, 2 Drawing Sheets

__US 10,010,827 B2__

PROCESS FOR TREATMENT OF SEWAGE SLUDGE

BACKGROUND

The present disclosure relates to a process for treating organic sludge to remove viable pathogenic organisms and reduce vector attraction while significantly reducing residual toxic vapors.

As human population continues to increase, the amount of solid waste generated by human activities also increases. Dealing with this increase in waste has put stress on waste treatment facilities, and new or improved methods of treatment are necessary. Treating solid waste can generate byproducts that are detrimental to the environment, thus, negating the benefits achieved by treatment.

Pollution control authorities such as the Environmental Protection Agency, require that sewage be treated to remove pathogens prior to utilization or disposal of the waste. Sewage is often disposed of in land fills, surface sites, incineration or application to land. Land fill and surface sites are rapidly filling. Incineration requires the use of expensive fuel and contributes to air pollution. A more productive use of waste involves application to land in agricultural production due to the beneficial organic and mineral components of the waste. However, treated waste must be of low toxicity, or non-toxic, to be used in agriculture; as well as being essentially pathogen free. Chemical treatment of organic sludge to destroy microbial pathogens is known in the art. Treatment may be in the form of chemical addition or temperature elevation. Many chemical treatment processes rely on treating sludge a batch at a time or require additional treatment at remote locations due to insufficient on-site equipment.

Chemical treatment of waste often generates toxic byproducts, rendering the treated was inapplicable for use in agriculture. Additionally, toxic vapors may result in areas near treatment facilities experiencing problems with the pollution, including health and unpleasant odors.

Chemical treatment of sewage sludge often produces toxic gases that are difficult to manage and dispose of. While automated processes of chemical treatment of sewage sludge are known in the art, a more efficient and clean process for destroying pathogens and reducing pest attraction is desirable. The use of MITC generating compounds for pathogen reduction and vector-attraction reduction in sewage sludge is known in the art. U.S. Patent Application 2007/0084804 discloses a method for treating sewage sludge with MITC for pathogen reduction. U.S. Patent Application 2014/0290318 discloses a method for treating sewage sludge with MITC for vector-attraction reduction. While both the '804 and '318 applications claim the use of MITC for sewage sludge treatment, neither discloses a method to improve efficiency of MITC use in waste treatment, or discloses a method to use MITC in heavily populated areas without allowing MITC to enter the atmosphere.

Control of toxic gases in sewage treatment systems has been a long-standing problem. Odorous and toxic gases may escape into the environment in proximity to a sewage system which can result in unhealthy and dangerous for those living in the vicinity of such a system. U.S. Pat. No. 4,208,383 relates to the scrubbing of acids and pre-acids such as $SO2$. The '383 application also relates to the scrubbing of $CO2$ to generate carbonates and bicarbonates. Scrubbing of toxic gaseous or liquid material from treated waste is not a new concept. However, minimizing additional materials and cost from the process is an ongoing need in the field. Reducing or destroying pathogen content without adding unnecessary toxic material to the process is a goal of research in this area.

Patents in the literature have described numerous methods of dealing with high pathogen containing waste, such as sewage sludge; and the toxic fumes that may result. U.S. Pat. No. 5,422,015 relates to a waste treatment system for removing pathogens from sewage sludge. In the '015 patent, a method of treatment of sludge with an acid, along with a material that will react exothermically with the acid, generate heat to destroy pathogens in the waste. The gases generated by this process may be absorbed by a liquid, rather than exhausted into the atmosphere.

U.S. Pat. No. 4,208,383 relates to a process and apparatus for the absorptive removal of pollutants from waste gases. The '383 patent describes a process whereby gas containing a contaminant is passed from supply tanks into an absorber. The '383 patented process neutralizes the pollutant in the gas through the use of lime, sodium hydroxide or other neutralizing agent.

U.S. Pat. No. 4,793,927 relates to a method for chemically disinfecting sewage with an ammonia source and converting it into an impermeable, friable mass with cement and silicate. A strongly alkaline environment kills bacteria and viruses. While effective, the method of the '927 patent, does not leave the soil in a condition for beneficial agricultural use in many areas.

The expansion of sewage treatment systems into new developments or heavily populated environments can be limited due to real estate unavailability, neighbor aesthetic complaints, zoning restrictions, lack of capital availability or the use of potentially toxic treatment chemicals that may enter the atmosphere or water supply to remove pathogens. These factors can result in the need for sewage to be transported from the source of treatment to a remote location. This process requires additional expense. The alternative, adding air treatment equipment such as conventional scrubbers, as described in the patent literature included above, also requires substantial maintenance effort and expense. However, the present disclosure provides a method and system that improves efficiency when toxic chemicals produce gases that may be detrimental to the surrounding environment, thereby overcoming the above listed problems.

SUMMARY OF THE INVENTION

The present disclosure relates to a process for treating sludge that improves efficiency and reduces toxic emissions. The present disclosure provides a method for minimizing the number of steps required to destroy pathogens during sludge treatment. Additional benefit of the process is to reduce pollution of the environment. Additional features and advantages of the present disclosure will be set forth in part in the description which follows, and in part will be apparent from the description, or may be learned by practice of the present disclosure.

To achieve these and other advantages and in accordance with the purposes of the present disclosure, as embodied and broadly described herein, the present disclosure relates to a method to destroy pathogens in sewage sludge comprising admixing sewage sludge with a pathogen destroying chemical in an amount effective to destroy pathogens while recycling and reusing, rather than discharging, excess pathogen destroying chemicals.

In accordance with one important aspect of the invention, a method is provided for, preparing sewage sludge, which, for the purposes of the present system may be up to about 10% solids, for treatment by conventional means then conducting it to a reactor tank where it is mixed with an appropriate amount of metam sodium. The metam sodium reacts with the sludge to generate methyl isothiocyantate (MITC) at a level adequate to eliminate pathogens. The treated sludge is then sent to a hold tank for a predetermined time. The method contemplates the introduction of an alkali, such as sodium hydroxide. The use of an alkali is beneficial to augment the metam sodium in destroying pathogens by raising the pH to a suitable level. In one aspect of the present disclosure, in the hold tank, sodium hydroxide is added to raise the pH of the sludge to a level effective in further reducing pathogens and vector attraction in accordance with existing regulations sufficient for discharge of the treated sludge.

The treated sludge is then conducted to a MITC removal tank. MITC is toxic and a lacrymator and may be detrimental to the environment; therefore, MITC removal is often required prior to sludge leaving the treatment system. However, rather than removing MITC from vapors generated during treatment via adsorption or chemical destruction, excess MITC can be put to further use by applying it to untreated sludge. The preferred embodiment of the present disclosure reuses MITC vapor by reintroducing it to heretofore untreated sludge in a scrubber tank. The preferred embodiment incorporates untreated sludge material into the scrubber, thereby utilizing untreated sludge material to replace traditional scrubbing chemicals or absorbants. This method of scrubbing improves efficiency over existing systems and reduces cost. A further objective of the scrubber is to reduce MITC released to the atmosphere to non-detectable levels.

The preferred embodiment of the present disclosure incorporates a scrubber in fluid communication with the hold tank and the MITC removal tank. Rather than dispose of the excess MITC or release it into the environment, the MITC vapor is conducted to a scrubber. The MITC vapor filters through the sludge and destroys pathogens.

The accompanying drawings, which are incorporated in and constitute a part of this application, illustrate some of the embodiments of the present disclosure and together with the description, serve to explain the principles of the present disclosure.

BRIEF DESCRIPTION OF THE DRAWINGS

In the description which follows, like elements are marked throughout the specification and drawing with the same reference numerals, respectively. The drawings are not to scale and at least certain conventional elements are shown in schematic form using conventional symbols for same. The present disclosure and the manner in which it may be practiced is further illustrated with reference to the accompanying drawings wherein.

DETAILED DESCRIPTION OF INVENTION

Figure 1:
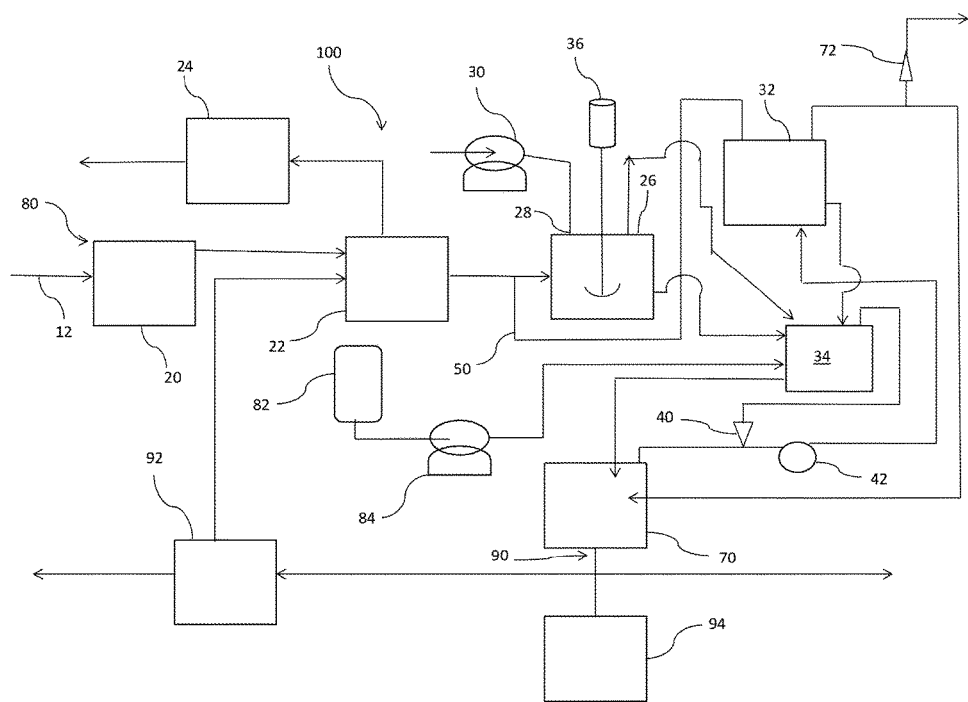
FIG. 1 shows a schematic view of the process 100.

Referring to FIG. 1, a sludge treatment system 100 is provided according to an embodiment of the present disclosure. The sewer system illustrated and described is exemplary and the system and method of the invention may be carried out in a wide variety of sewage handling and treatment systems as well as other structures having a contaminated vapor space requiring treatment in accordance with the invention. The system is generally designated by the numeral 100. Certain conventional components such as certain shut-off valves, check valves and take-off valves, pressure gauges, vents, connectors and other devices used in a test system are illustrated in FIG. 1 but may not be described in detail herein in the interest of clarity and conciseness. Sludge treatment system 100 preferably includes a grit chamber 20 having a sludge input 80 and a sludge output 90. Between the input and the output are receptacles serving different purposes in sludge treatment system 100. One or more sludge sources 12 is connected to sludge treatment system 100. To add metam sodium, sludge treatment system 100 is equipped with metam sodium input 28. Preferably, metam sodium input 28, sludge input 80 and sludge output 90 each comprise a rigid connector, for example, a stainless steel pipe. These rigid connectors are preferably welded or otherwise connected at one end to an outlet or inlet of a treatment unit or other device as described below. The other end of each rigid connector preferably extends to or into a source or receptacle.

After input into the grit chamber 20, the sludge is conducted to a clarifier 22, where it is further concentrated to approximately 2-4% solids. Any excess clarified water from clarifier 22 is conducted to clarifier overflow 24 where it is oxidized with chlorine or the like and discharged. Sludge is generally transferred from clarifier 22 to a reactor 26 equipped with a means of agitating 36 the sludge, as would be known to one of ordinary skill in the art. In reactor 26, settled sludge from the bottom of the clarifier is mixed with an appropriate amount of metam sodium, as supplied from metam sodium input 28. Addition of metam sodium is proportionate to the total incoming sludge dry solids content and is charged to the reactor by means of a metering pump 30.

In the preferred embodiment of the present disclosure, it has been found that the most convenient form for exposing said sludges to an effective amount of MITC is to thoroughly mix said sludge with a liquid having at least one MITC releasing chemical dissolved therein. In the preferred embodiment thorough mixing is readily accomplished by a turbine or propeller-type mixer, however, any apparatus capable of intimately commingling a wet, cohesive mass (types of sludges as would be appreciated by one of skill in the art) with liquids or gases would be satisfactory as well. Once mixed, metam sodium reacts with the sludge to generate MITC at a level proportional to eliminate certain pathogens.

The concentrations of the preferred chemicals for use in the method of the invention contemplate between 3 to 12 gallons metam sodium per dry ton of sewage solids (7.3 pounds of MITC to 29.3 pounds of MITC generated by the cited gallons) and between a pH of 10.2 and 12 generated by sodium or potassium hydroxide in hold tank 34. Preferred concentrations of metam sodium is about 5 to 7 gallons of metam sodium per dry ton of sewage solids and between a pH of 11.o to 12.0 for sodium hydroxide or potassium hydroxide.

The choice of concentrations and pH of the reactive agents depend on the optimum operating range of the system, which may vary depending on the nature of the waste material and the particular configurations of the system.

The treated sludge is then sent to a hold tank 34 for a predetermined time. In the hold tank, sodium hydroxide is added to raise the pH of the sludge to a level effective in further reducing pathogens in accordance with existing regulations sufficient for discharge of the treated sludge and reducing vector attraction. Sodium hydroxide or other alkaline material such as potassium hydroxide are fed to the hold tank 34 preferably from a sodium hydroxide storage tank 82 by means of a variable speed pump 84 controlled by the pH of hold tank 34 contents.

Following treatment in hold tank 34, the sludge is conducted through appropriate pipes and fittings to an MITC removal tank 70, where it is contacted with recycle gas from a scrubber 32.

Prior to entering reactor 26, a fraction of the clarified sludge is diverted to scrubber 32 through a diversion pipe 50. The treatment system 100 preferably contains a single scrubber 32, although a plurality of scrubbers 32 may also be used. The scrubber 32 removes residual amounts of MITC which may be present in the vapor space in the MITC removal tank 70.

Scrubbers are generally well-known in the art. Scrubbers may contain a reagent or treating solution for neutralizing or otherwise treating the hazardous gas, such as MITC, or other waste. In the arrangement provided in FIG. 1, the scrubber 32 may be charged with untreated sludge, although other solutions may be contemplated. For example, in alternative embodiments of the present disclosure scrubber 32 may be further charged with an alkaline or caustic solution, scrubber 32 may be further charged with an acid reagent or solution, or an oxidizing solution. If sludge treatment system 100 has multiple scrubbers 32, the treating solutions in any two of the scrubbers 32 may be the same or different.

Scrubbers 32 are preferably designed to work over a range of pressures and should be able to treat concentrations of waste gas up to 100%. Moreover, scrubber 32 preferably comprises an inlet or inlets near the bottom thereof. This placement of the inlet preferably allows the waste gas to be received by the scrubber underneath the sludge in the preferred embodiment.

Scrubber 32 preferably incorporates a mixing means that facilitates mixing of the MITC vapor with the sludge or treating solution of scrubber 32. A swirling motion of the MITC vapor and sludge is preferably obtained, thereby increasing residence time and efficiency of treatment. As the scrubber 32 receives untreated sludge the volume increases in the tank, whereupon overflow is discharged to the hold tank 34 through appropriate pipes and fittings. The scrubber 32 is replenished with untreated sludge periodically or on a continuous basis to insure that there is sufficient untreated material to react with and remove MITC.

In the preferred embodiment of the present disclosure, a vapor circulation means 42 is preferably provided for conducting MITC containing vapor from MITC removal tank 70 to scrubber 32 through suitable pipes and fittings. The hold tank 34 is also in fluid communication with vapor circulation means 42 to conduct any MITC vapor through a check valve 40 preferably to the inlet of a blower as part of the vapor circulation stream conducted to the scrubber 32. The MITC vapor preferably enters scrubber 32 beneath the sludge and filters upward. Once passed through scrubber 32, vapor scrubbed of MITC is returned to the MITC removal tank 70. Any excess air built up after scrubbing may escape through a vent 72. An additional line from the MITC reactor 26 to hold tank 34 allows vapors to pass from the reactor 26 to the hold tank where it can be ultimately sent to the scrubber 32. Without the additional line, vapors may build up in the MITC reactor.

After treatment in MITC removal tank 70, sludge may be filtered in filter tank 92. Optionally, treated sludge may be neutralized in neutralization tank 94. In one aspect of the present disclosure, the filtrate from tank 92 is sent to clarifier 22. A combination of these two ancillary steps may also be practiced.

Sludge treatment system 100 may be monitored and controlled remotely by an operator. In an embodiment of the present disclosure, a control room may be provided with a control panel which may be capable of selectively and remotely controlling inputs and outputs as well as measuring and monitoring within the system as appropriate. These connections may be achieved by any appropriate method, whereby inputs and outputs receive electronic signals from control panel. These signals would preferably control the flow levels and amounts entering and leaving the respective inputs and outputs, in one embodiment through opening or closing of valves or adjusting pressure.

Figure 2:
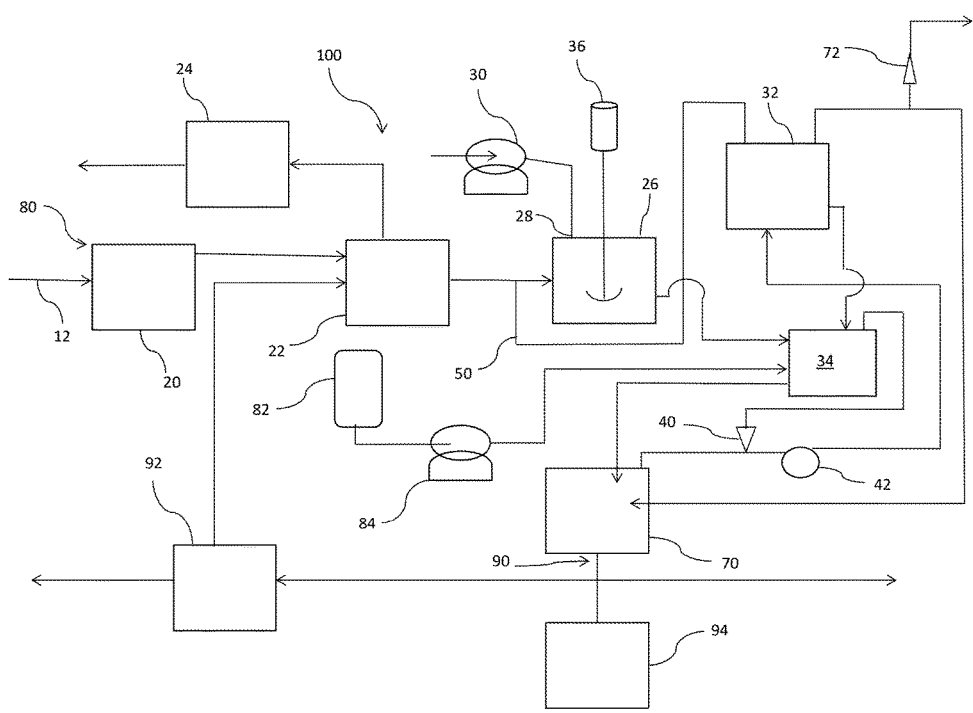
FIG. 2 shows a schematic view of an alternative embodiment of process 100.

In an alternative embodiment shown in FIG. 2, there is no additional line from the MITC reactor 26 to hold tank 34 allows vapors to pass from the reactor 26 to the hold tank.

In an embodiment of the present disclosure, the control room is provided with remote viewing devices. Further, the control room contains sampling panel, which is operatively linked to a remote valve actuation mechanism to measure concentrations of chemicals within elements of treatment system 100.

Experiments were performed demonstrating that sewage sludge was effective at scrubbing MITC from air.

EXAMPLE 1

Experiment B

Pilot Scale of Class B Process

Data acquired from the Class B process is summarized in Table 1. Data is reported in ppm (vol./vol.) applying the universal gas law under STP conditions for MITC. Data shows that MITC concentration appears to have maximized between 3-4 ppm after 6-hours of mixing. At the maximized air concentration, all scrubber effluent results were near detection limits. FIG. 3 shows GC chromatograms of a NIOSH tube extract from a 2-L air influent and effluent air sample from the scrubber. MITC is reduced from 2.34 to 0.04 ppm in this example. The largest volume of air measured was the overnight sample at 84-L. The influent extract sample from this measurement was examined by GC-MS. FIGS. 4 and 5 show the GC-MS chromatograms/results for a MITC standard and the 84-L extract sample. MS spectral search shows a good match for MITC with the NIST library. This work confirms our GC/FID analysis for the identification of MITC in air from this study. In addition, sulfides were also tentatively identified in this sample. Quantitatively the GC-MS result for this sample are in good agreement with the GC/FID findings for this sample (930 vs. 900-µg, respectively).

Experiment C

Pilot Scale of Class A Process

Data acquired from the Class A process is summarized in Table 2.

Following the 14-hour static (no airflow) time of this experiment it was noted that the sparge tube into the scrubber clogged. This resulted in reduced flows for the first hour of sampling (~20-mL/min.). Data at these reduced flows are not presented since the rates were considered inconsistent and the results suspect. The sparge tube was cleaned and the experiment proceeded at normal flow rate (100-mL/min.) resulting in the remainder of the data set. MITC concentration in air reached its highest level at 13-ppm. Effluent from the scrubber at this influent level showed 0.2-ppm for a 98% removal.

Experiment D

Pilot Scale of Class B Process—Sampling Sludge Suspension

Data in Table 3 summarizes the quality control measurements and sample results for the determination of MITC content in sludge. Data show that at the conclusion of experiment D, 93.4-µg/g of MITC remained in the sludge. Considering 1.6-mL of Rid-A-Vec™ is added to the suspension, Metam sodium can generate 0.45-g MITC. This is in 1500-g of sludge suspension, which can generate a concentration of 300-µg/g.

Close batch reactor samples from experiments from B and C were also examined for MITC content. Results are included in the table. It should be noted that for these two samples measurement was conducted 22 and 14 days following sample generation for experiments B and C, respectively. Samples were stored in zero headspace vials at 4° C. prior to analysis.

TABLE 1

Experiment B - Class B Process Results Summary

| ID | Elapsed Time (min.) | Vol. (L) | MITC Content | |
|---|---|---|---|---|
| | | | Influent (ppm) (vol./vol.) | Effluent (ppm) (vol./vol.) |
| 1022-104-C/D | 10 | 1.0 | 0.92 | ND0.03 |
| 1022-104-E/F | 20 | 1.0 | 1.25 | ND0.03 |
| 1022-104-G/H | 30 | 1.0 | 0.96 | ND0.03 |
| 1022-104-I/J | 40 | 1.0 | 1.31 | ND0.03 |
| 1022-104-K/L | 50 | 1.0 | 1.19 | 0.03 |
| 1022-104-M/N | 60 | 1.0 | 1.43 | 0.04 |
| 1022-104-O/P | 70 | 1.0 | 2.67 | 0.04 |
| 1022-105-A/P | 90 | 2.0 | 1.20 | 0.02 |
| 1022-105-C/D | 110 | 2.0 | 2.34 | 0.04 |
| 1022-105-E/F | 130 | 2.0 | 1.70 | 0.03 |
| 1022-105-I/J | 250 | 6.0 | 0.83 | 0.02 |
| 1022-105-K/L | 310 | 6.0 | 2.24 | 0.03 |
| 1022-105-M/N | 370 | 6.0 | 3.27 | 0.02 |
| 1022-105-O/P | 430 | 6.0 | 0.91 | 0.02 |
| 1022-105-Q/R | 1270 | 84.0 | 3.62 | 0.01 |
| 1022-105-S/T | 1405 | 13.5 | 3.83 | 0.02 |
| 1022-105-U/V | 1645 | 24.0 | 4.07 | 0.01 |

TABLE 2

Experiment C - Class A Process Results Summary

| ID | Elapsed Time (min.) | Vol. (L) | MITC Content | |
|---|---|---|---|---|
| | | | Influent (ppm) (vol./vol.) | Effluent (ppm) (vol./vol.) |
| 1022-106B | 30 | 0.5 | 3.11 | 0.50 |
| 14-HOUR STATIC PERIOD | | | | |
| 1022-106G | 930[a] | 0.5 | 9.07 | 0.24 |
| 1022-106H | 960 | 0.5 | 10.6 | 0.23 |
| 1022-106I | 1020 | 1.0 | 10.0 | 0.23 |
| 1022-106J | 1080 | 1.0 | 9.37 | 0.17 |
| 1022-106K | 1200 | 2.0 | 13.4 | 0.21 |
| 1022-106L | 1320 | 2.0 | 13.4 | 0.22 |

[a]After the static period of 14-hours the sparge tube in the scrubber was clogged. Flow was discontinued and the sparger cleaned. Thus this samples was taken after a duration of 15:30 hours (930 min.).

TABLE 3

Experiment D - Sludge Water Suspension from Close Batch Reactor Analysis for MITC

| Sample | MITC (µg/g) |
|---|---|
| 1022-109I Exp. D | 93.4 |
| Spiked at 324-µg/g % Recovery = 83% | |
| 1022-109E Exp. B | 85.2[a] |
| Spiked at 334-µg/g % Recovery = 86% | |
| 1022-109E Exp. C | 85.2[a] |

[a]Note samples analyzed several days after generation.

Although exemplary embodiments have been shown and described, it will be clear to those of ordinary skill in the art that a number of changes, modifications, or alterations to the disclosure as described may be made. All such changes, modifications, and alterations should therefore be seen as within the scope of the disclosure.

I claim:

1. A waste treatment method comprising:
providing a fluid stream of a waste material;
diverting an ancillary portion of the fluid stream of waste material to a scrubber;
providing a primary portion of the fluid stream of the waste material to a mixing reaction vessel;
adding an MITC generating compound to the mixing reaction vessel;
mixing a combined material comprising the primary portion of the waste material and the MITC generating compound in the mixing reaction vessel for a period of time sufficient to distribute the MITC generating compound throughout the primary portion of the waste material;
providing a mixed material comprising the MITC generating compound and the primary portion of the waste material to a holding tank;
adding an alkaline compound to raise the pH of the mixed material in the holding tank;
incubating the mixed material in said holding tank;
providing a holding tank off-gas line to route a holding tank MITC vapor from the holding tank to the scrubber;
providing the treated material to an MITC removal tank;

providing an MITC removal tank off-gas line to route a MITC removal tank MITC vapor from the MITC removal tank to the scrubber;
discharging the treated material;
scrubbing the ancillary portion of the waste material; and
providing a scrubbed material from the scrubber to the holding tank.

2. The method of claim 1, wherein said scrubbing step comprises the following steps:
dispersing MITC vapor from at least one of the MITC removal tank and the holding tank through said ancillary waste material in the scrubber;
allowing decontaminated air to collect in a scrubber gas head space,
transporting, recycling the decontaminated gas stream from said scrubber to the MITC removal tank; and
conducting the method described herein continuously.

3. The method of claim 1, further comprising changing the flow rates of waste material.

4. The method of claim 1, further comprising allowing the holding tank MITC vapor to collect in a holding tank gas head space and a removal tank gas head space above the waste material in said holding tank and said MITC removal tank and, providing the holding tank MITC vapor to the scrubber.

5. The method of claim 1, wherein no outside gas is used.

6. The method of claim 1, wherein a recirculation of vapor in the waste treatment system utilizes only a vapor that has entered as a dissolved gas, residual MITC vapors and by-product gases such as $CO_2$ which may be generated by the chemical reactions of NaOH or KOH with organic matter.

7. The method of claim 1, wherein the MITC generating compound is selected from a group consisting of tetrahydro-3,5-dimethyl-2H-1,3,5-thiadiazine-2-thione and the chemical salts of monomethyldithiocarbamate.

8. The method of claim 1, wherein the treated waste material retains nutrients beneficial to a soil.

9. The method of claim 1, wherein the scrubber contains coal for scrubbing the MITC containing gas.

10. The method of claim 1, wherein the scrubber comprises a housing, a venturi having an outlet disposed within said housing, and a pump in communication with said housing and operatively coupled to said venturi; wherein said venturi mixes a treating solution and the waste material.

11. The method of claim 1, wherein the scrubber comprises a plurality of baffles positioned between an inlet and an outlet of said scrubber.

12. The method of claim 1, wherein the alkaline compound is NaOH.

13. The method of claim 1, wherein said method comprises returning treated waste material to clarifier.

14. The method of claim 1, wherein said method comprises determining a concentration of contaminants within the scrubber.

15. The method of claim 1, wherein said method comprises determining a concentration of MITC within a scrubber gas head space of the scrubber; and, metering the ancillary portion of the waste material to the scrubber based on the concentration of MITC within the scrubber gas head space.

16. A method of treating sewage sludge, comprising:
providing a mixing reaction vessel;
adding sewage sludge to the mixing reaction vessel;
diverting a fraction of the sewage sludge to a scrubber prior to adding the sewage sludge to the mixing reaction vessel;
adding an MITC generating compound to the mixing reaction vessel;
mixing in the mixing reaction vessel for a period of time sufficient to distribute MITC generating compound throughout the sewage sludge;
providing mixed MITC generating compound and sewage sludge to a holding tank;
adding a compound sufficient to raise the pH of the mixed material in the holding tank;
incubating the MITC generating compound and sewage sludge in said holding tank at an increased pH for a period of time between 4 and 20 hours;
providing MITC vapor from the holding tank to the scrubber;
providing mixed MITC and sewage sludge to an MITC removal tank;
providing MITC vapor from the MITC removal tank to the scrubber; and
providing treated waste from the scrubber to the holding tank.

17. The method of claim 16, wherein activated charcoal is included with sewage sludge in the scrubber.

18. The method of claim 1, further comprising adding at least one MITC releasing chemical to the treated material.

19. A method of treating sewage sludge, comprising:
providing a mixing reaction vessel;
adding sewage sludge to the mixing reaction vessel;
diverting a fraction of the sewage sludge to a scrubber prior to adding the sewage sludge to the mixing reaction vessel;
adding an MITC generating compound to the mixing reaction vessel;
providing MITC vapor from MITC treated sewage sludge to the scrubber; and
providing treated waste from the scrubber to a holding tank.

* * * * *